(12) United States Patent
Noguchi et al.

(10) Patent No.: US 12,311,319 B2
(45) Date of Patent: May 27, 2025

(54) FILTRATION MEMBRANE UNIT, HOLDER HOLDING SAME, FILTRATION SYSTEM INCLUDING FILTRATION MEMBRANE UNIT AND HOLDER, AND FILTRATION TREATMENT APPARATUS INCLUDING PLURALITY OF FILTRATION SYSTEMS

(71) Applicant: MEIDENSHA CORPORATION, Tokyo (JP)

(72) Inventors: Hiroshi Noguchi, Singapore (SG); Terutake Niwa, Singapore (SG); Akitoshi Nakagawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/849,413

(22) PCT Filed: Mar. 8, 2023

(86) PCT No.: PCT/JP2023/008747
§ 371 (c)(1),
(2) Date: Sep. 20, 2024

(87) PCT Pub. No.: WO2023/181934
PCT Pub. Date: Sep. 28, 2023

(65) Prior Publication Data
US 2025/0108334 A1   Apr. 3, 2025

(30) Foreign Application Priority Data

Mar. 23, 2022   (JP) ................................. 2022-046226

(51) Int. Cl.
*B01D 63/08*   (2006.01)
*B01D 71/02*   (2006.01)

(52) U.S. Cl.
CPC ......... *B01D 63/0822* (2022.08); *B01D 71/02* (2013.01); *B01D 2313/025* (2013.01); *B01D 2313/12* (2013.01); *B01D 2317/04* (2013.01)

(58) Field of Classification Search
None
See application file for complete search history.

(56) References Cited

U.S. PATENT DOCUMENTS

| 6,117,322 A | 9/2000 | Miller et al. |
| 2010/0282655 A1* | 11/2010 | Matsuzaki ......... B01D 63/0821 210/151 |

(Continued)

FOREIGN PATENT DOCUMENTS

| JP | H07-504120 A | 5/1995 |
| JP | 2013-017920 A | 1/2013 |

(Continued)

*Primary Examiner* — Krishnan S Menon
(74) *Attorney, Agent, or Firm* — Foley & Lardner LLP

(57) ABSTRACT

A filtration membrane unit includes a filtration membrane and a suction side socket fixed to an end on one side in a longitudinal direction of the filtration membrane to hold the filtration membrane. The suction side socket extends in a lateral direction of the filtration membrane in a fixed state, and includes a recess into which the end is inserted. A flow path communicated with the recess extends in an extending direction of the suction side socket. A discharge port for discharging filtrate in the flow path is provided. The suction side socket includes a first outlet disposed on one side in the extending direction with respect to a center in the extending direction of the suction side socket, and a second outlet disposed on another side in the extending direction with respect to the center in the extending direction of the suction side socket.

6 Claims, 12 Drawing Sheets

(56) References Cited

U.S. PATENT DOCUMENTS

2011/0174727 A1* 7/2011 Ishikawa ................. C02F 1/003
                                                                                  210/498
2016/0030888 A1* 2/2016 Diemer ............. B01D 63/0822
                                                                                  210/433.1

FOREIGN PATENT DOCUMENTS

| JP | 2013-063382 A | 4/2013 |
| KR | 20-0312518 Y1 | 5/2003 |
| KR | 10-2006-0019241 A | 3/2006 |
| WO | WO-2007/128565 A2 | 11/2007 |

* cited by examiner

FILTRATION MEMBRANE UNIT, HOLDER HOLDING SAME, FILTRATION SYSTEM INCLUDING FILTRATION MEMBRANE UNIT AND HOLDER, AND FILTRATION TREATMENT APPARATUS INCLUDING PLURALITY OF FILTRATION SYSTEMS

TECHNICAL FIELD

The present invention relates to a filtration membrane unit, a holder holding the same, a filtration system including the filtration membrane unit and the holder, and a filtration treatment apparatus including a plurality of filtration systems.

BACKGROUND ART

Conventionally, a filtration membrane unit including a filtration membrane and a socket fixed to an end on one side in a longitudinal direction of the filtration membrane in order to hold the membrane on the one side in the longitudinal direction is known.

For example, a filter unit as a filtration membrane unit described in Patent Literature 1 includes a ceramic filter as a filtration membrane and a holder as a socket. The ceramic filter has a flat plate shape. The holder extends along a lateral direction of the ceramic filter in a state of being fixed to an end on one side in a longitudinal direction of the ceramic filter having a flat plate shape. In addition, the holder includes a recess into which the end of the ceramic filter is inserted, a flow path extending in an extending direction of the holder while communicating with the recess, and a filtrate outlet as a discharge port for discharging a filtrate in the flow path. When a negative pressure is generated at the filtration outlet by a suction force of a pump or the like, the treatment target water present around the ceramic filter is sucked into the fine pores of the ceramic filter and filtered. The filtrate is discharged from the inside of the ceramic filter through the flow path of the holder from the filtration outlet.

CITATION LIST

Patent Literature

Patent Literature 1: WO 2007/128565 A2

SUMMARY OF INVENTION

Technical Problem

In the filter unit described in Patent Literature 1, the filtrate outlet is disposed at one end in the extending direction of the holder. In such a configuration, the negative pressure in the filter varies in the lateral direction of the ceramic filter. Specifically, in the entire region in the lateral direction of the ceramic filter, the negative pressure in a region relatively close to the filtrate outlet is larger than the negative pressure in a region relatively far from the filtrate outlet. Thus, the amount of filtered water per unit time in the former region becomes larger than the amount of filtered water per unit time in the latter region, and clogging in the former region progresses faster than that in the latter region. As a result, as compared with the filter unit in which variation in the amount of filtered water in each region is relatively small, a time interval of filter cleaning operation performed to remove clogging is shortened, and maintainability is impaired.

The present invention has been made in view of the above background, and an object thereof is to provide a filtration membrane unit capable of improving maintainability of a filtration membrane, a holder holding the same, a filtration system including the filtration membrane unit and the holder, and a filtration treatment apparatus including a plurality of filtration systems.

Solution to Problem

In order to achieve the object, one aspect of the present invention is a filtration membrane unit including a filtration membrane and a socket fixed to an end on one side in a longitudinal direction of the filtration membrane in order to hold the filtration membrane on one side in the longitudinal direction, in which the socket extends in a lateral direction of the filtration membrane in a state of being fixed to the end, and the socket includes a recess into which the end is inserted, a flow path communicating with the recess and extending in an extending direction of the socket, and a discharge port for discharging a filtrate in the flow path, wherein the socket includes, as the discharge port, a first outlet disposed on one side in the extending direction with respect to a center in the extending direction of the socket, and a second outlet disposed on another side in the extending direction with respect to the center in the extending direction of the socket.

Advantageous Effects of Invention

According to the present invention, there is an excellent effect that maintainability of a filtration membrane can be improved.

DESCRIPTION OF EMBODIMENTS

Figure 1:
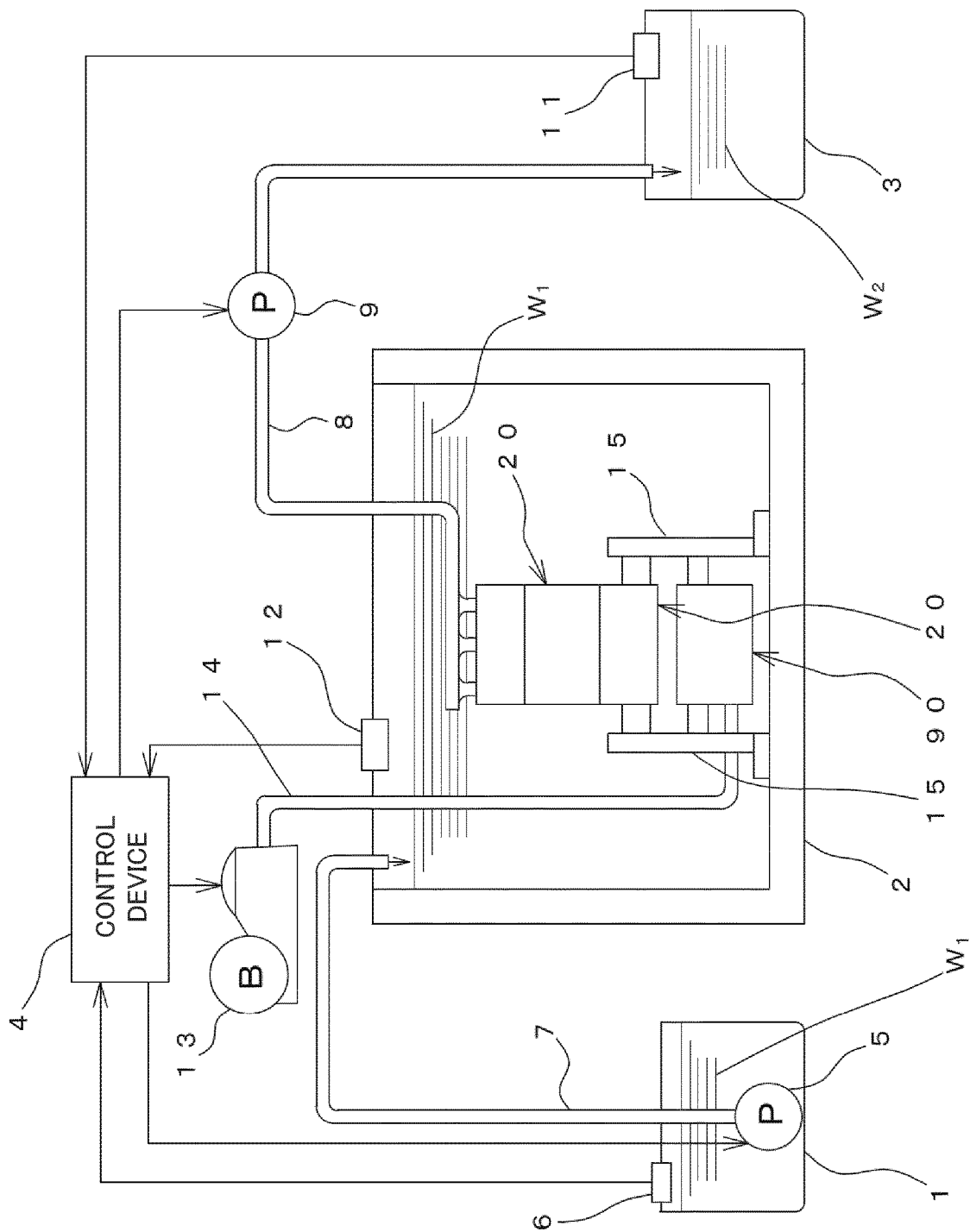
FIG. 1 is a diagram illustrating a schematic configuration of a water treatment facility including a filtration system according to an embodiment.

Hereinafter, an embodiment of a filtration treatment apparatus to which the present invention is applied will be described with reference to the drawings. In the embodiment, for easy understanding, structures and elements other than a main part of the present invention will be described in a simplified or omitted manner. In each drawing, the same elements are denoted by the same reference numerals. Note that the shapes, dimensions, and the like of elements illustrated in the drawings are schematically illustrated, and do not indicate actual shapes, dimensions, and the like.

FIG. 1 is a diagram illustrating a schematic configuration of a water treatment facility including a filtration treatment apparatus according to the embodiment. The water treatment facility includes a raw water tank 1, a filtration treatment water tank 2, a treated water tank 3, a control device 4, a raw water pump 5, a first water level sensor 6, a raw water transfer pipe 7, a treated water transfer pipe 8, a suction pump 9, a second water level sensor 11, a third water level sensor 12, and the like. The water treatment facility includes a blower 13, an air supply pipe 14, a frame 15, a filtration treatment apparatus 20, a bubble generation device 90, and the like.

In the raw water tank 1, raw water (water before treatment) $W_1$ as a liquid is stored. The first water level sensor including an ultrasonic sensor or the like installed in the raw water tank 1 detects the water level (water surface height) of the raw water $W_1$ in the raw water tank 1, and transmits the detection result to the control device 4 as a water level signal. The raw water pump 5 installed in the raw water tank 1 sucks and discharges the raw water $W_1$ in the raw water tank 1, and sends the raw water $W_1$ to the filtration treatment water tank 2 through the raw water transfer pipe 7. As the raw water pump 5, one including a submersible pump has been exemplified, but one including a land pump may be used.

The filtration treatment water tank 2 is a water tank made of reinforced concrete. In the filtration treatment water tank 2, a filtration treatment apparatus 20 and a bubble generation device 90 are installed. The filtration treatment apparatus 20 and the bubble generation device 90 are supported by a frame 15. The frame 15 supports the bubble generation device 90 so as to be positioned immediately below the filtration treatment apparatus 20. Each of the filtration treatment apparatus 20 and the bubble generation device 90 is immersed in the raw water $W_1$ in the filtration treatment water tank 2.

The blower 13 discharges air as gas sucked from a suction port to the air supply pipe 14 through the discharge port. The air discharged to the air supply pipe 14 is supplied to the bubble generation device 90. The bubble generation device 90 discharges the air supplied from the air supply pipe 14 upward as bubbles. The discharged air bubbles rise in the raw water $W_1$ while being in contact with a plurality of filtration membranes mounted on the filtration treatment apparatus 20. At this time, the air bubbles separate solids attached to surfaces of the filtration membranes from the surfaces of the filtration membranes. This separation suppresses clogging of the filtration membrane.

The third water level sensor 12 installed in the filtration treatment water tank 2 detects the water level of the raw water $W_1$ in the filtration treatment water tank 2, and transmits the detection result as a water level signal to the control device 4.

The suction pump 9 sucks the raw water $W_1$ in the filtration treatment water tank 2 via the treated water transfer pipe 8 and a plurality of filtration membranes to be described later mounted in the filtration treatment apparatus 20. The sucked raw water $W_1$ is filtered by a filtration membrane to become treated water $W_2$, and then sent to the treated water tank 3 through the treated water transfer pipe 8. The second water level sensor 11 set in the treated water tank 3 detects the water level of the treated water $W_2$ in the treated water tank 3, and transmits the detection result as a water level signal to the control device 4.

Note that, instead of the suction pump 9, a pump that generates a suction force using hydraulic head pressure may be used. Means for suction is not particularly limited.

When the water level of the treated water tank 3 does not reach an upper limit and a predetermined operation execution condition is satisfied, the control device 4 operates the suction pump 9 and the blower 13 to execute a filtration treatment of the raw water $W_1$. However, even if the operation execution condition is satisfied, when the water level of the raw water $W_1$ in the raw water tank 1 is equal to or lower than a lower limit and when the water level of the raw water $W_1$ in the filtration treatment water tank 2 is equal to or lower than a lower limit, the control device 4 stops the execution of the filtration treatment.

The filtration treatment apparatus 20 includes a plurality of filtration systems (described in detail later) according to the embodiment. Each filtration system includes a plurality of filtration membrane units (described in detail later) according to the embodiment.

Figure 2:
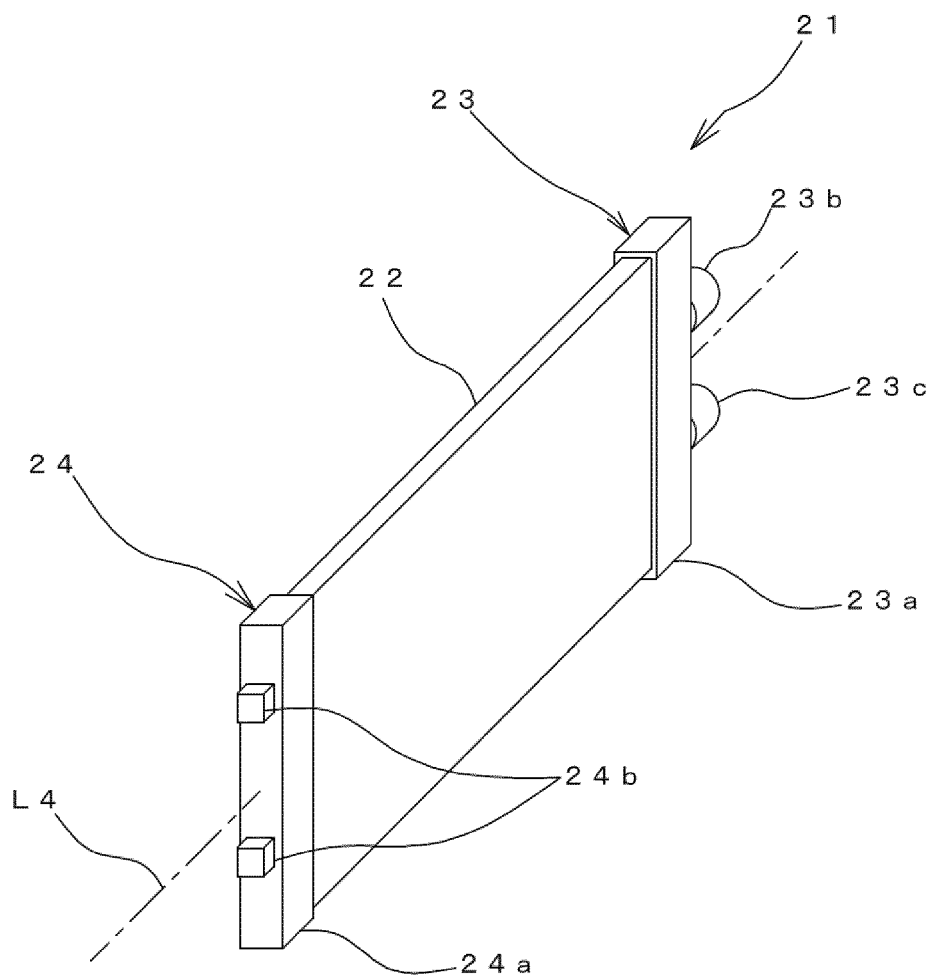
FIG. 2 is a perspective view illustrating a filtration membrane unit according to the embodiment.

FIG. 2 is a perspective view illustrating a filtration membrane unit 21 according to the embodiment. The filtration membrane unit 21 includes a flat filtration membrane 22. Examples of the material of the filtration membrane 22 include organic materials such as polyvinylidene fluoride (PVDF) and polyvinyl chloride (PVC). As a material of the filtration membrane 22, ceramic containing alumina, silicon carbide, or the like as a main component may be used. The filtration membrane 22 of the filtration membrane unit 21 according to the embodiment is made of a ceramic membrane.

When the above-described suction pump (9 in FIG. 1) is operated, a suction force along a longitudinal direction of the filtration membrane 22 is applied to the filtration membrane 22. In the filtration system according to the embodiment, a suction force is applied to the filtration membrane 22 from one side in the longitudinal direction of the filtration membrane 22 (right side in the left-right direction in FIG. 4 described later). That is, one side in the longitudinal direction of the filtration membrane 22 is a suction side to which a suction force is applied. The other side in the longitudinal direction of the filtration membrane 22 (left side in the left-right direction in FIG. 4 described later) is a shielding side that shields against the suction force applied to the filtration membrane 22.

The filtration membrane unit 21 includes a suction side socket 23 and a shielding side socket 24 in addition to the filtration membrane 22 described above. The suction side socket 23 as a socket in the present invention is fixed to an end on one side in the longitudinal direction of the filtration membrane 22 in order to hold the filtration membrane 22 on one side (suction side) in the longitudinal direction. The shielding side socket 24 is fixed to an end on the other side in the longitudinal direction of the filtration membrane 22 in order to hold the filtration membrane 22 on the other side (shielding side) in the longitudinal direction. Each of the suction side socket 23 and the shielding side socket 24 extends in a lateral direction of the filtration membrane 22 (vertical direction along a gravity direction in the embodiment) in a state of being fixed to the filtration membrane 22.

Figure 3:
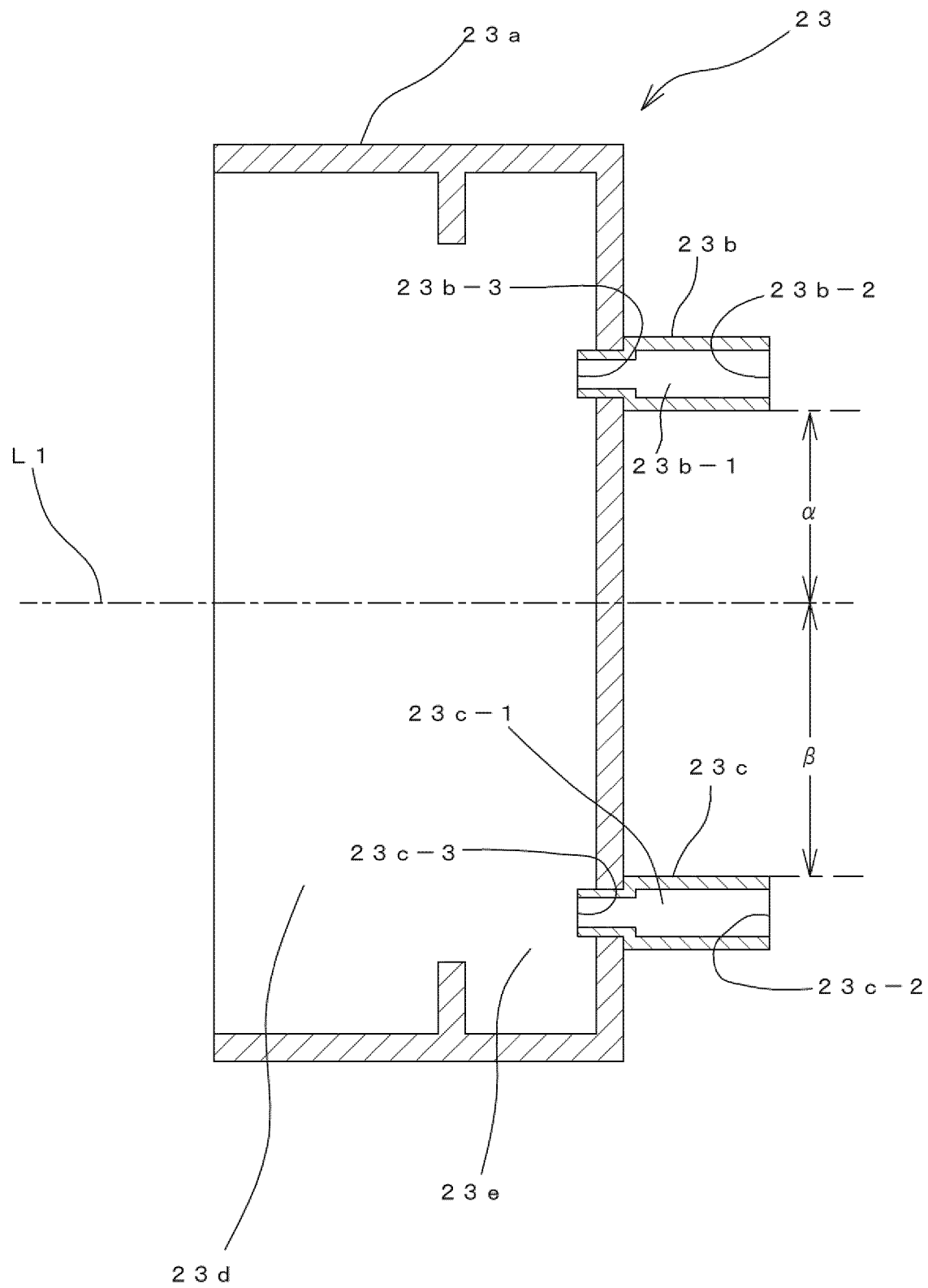
FIG. 3 is a cross-sectional view illustrating a longitudinal cross section of a suction side socket of the filtration membrane unit.

FIG. 3 is a cross-sectional view illustrating a longitudinal cross section of the suction side socket 23. The suction side socket 23 includes a socket body 23a. The socket body 23a includes a recess 23d into which an end on one side in the longitudinal direction of the filtration membrane (22 in FIG. 2) is inserted, and a flow path 23e that communicates with the recess 23d and extends in an extending direction of the socket body 23a.

The suction side socket 23 includes a first protrusion 23b and a second protrusion 23c in addition to the socket body 23a described above. The first protrusion 23b and the second protrusion 23c are positioned outside (right side in FIG. 3) the socket body 23a in the longitudinal direction (left and right direction in FIG. 3) of filtration membrane (22 in FIG. 2), and are arranged along the extending direction of the socket body 23a (vertical direction in FIG. 3).

The structure of each of the first protrusion 23b and the second protrusion 23c is a tubular structure having a hollow (23b-1 and 23c-1). The hollows (23b-1 and 23c-1) of the first protrusion 23b and the second protrusion 23c communicate with the flow path 23e of the socket body 23a. Further, the hollows (23b-1 and 23c-1) in the first protrusion 23b and the second protrusion 23c are opened at both ends in an extending direction (left-right direction in FIG. 3) of the protrusions (23b and 23c). Of the two openings in the hollow 23b-1 of the first protrusion 23b, the opening on one side (right side in FIG. 3) in the extending direction (left-right direction in FIG. 3) of the first protrusion 23b is a first outlet 23b-2 as a discharge port for discharging the treated water ($W_2$ in FIG. 1) in the flow path 23e. Of the two openings in the hollow 23c-1 of the second protrusion 23c, the opening on one side (right side in FIG. 3) in the extending direction (left-right direction in FIG. 3) of the second protrusion 23c is a second outlet 23c-2 as a discharge port for discharging the treated water in the flow path 23e.

The hollow 23b-1 of the first protrusion 23b communicates with the flow path 23e through an opening 23b-3 on the other side (left side in FIG. 3) in the extending direction (left-right direction in FIG. 3) of the first protrusion 23b, of the two openings thereof. In addition, the hollow 23c-1 of the second protrusion 23c communicates with the flow path 23e through an opening 23c-3 on the other side (left side in FIG. 3) in the extending direction (left-right direction in FIG. 3) of the second protrusion 23c, of the two openings thereof.

When the suction pump (9 in FIG. 1) is operated, a suction force due to negative pressure is generated in each of the hollow 23b-1 of the first protrusion 23b and the hollow 23c-1 of the second protrusion 23c. By this suction force, the treated water in the flow path 23e of the socket body 23a is sucked toward the inside of the hollow 23b-1 of the first protrusion 23b and the hollow 23c-1 of the second protrusion 23c.

Figure 4:
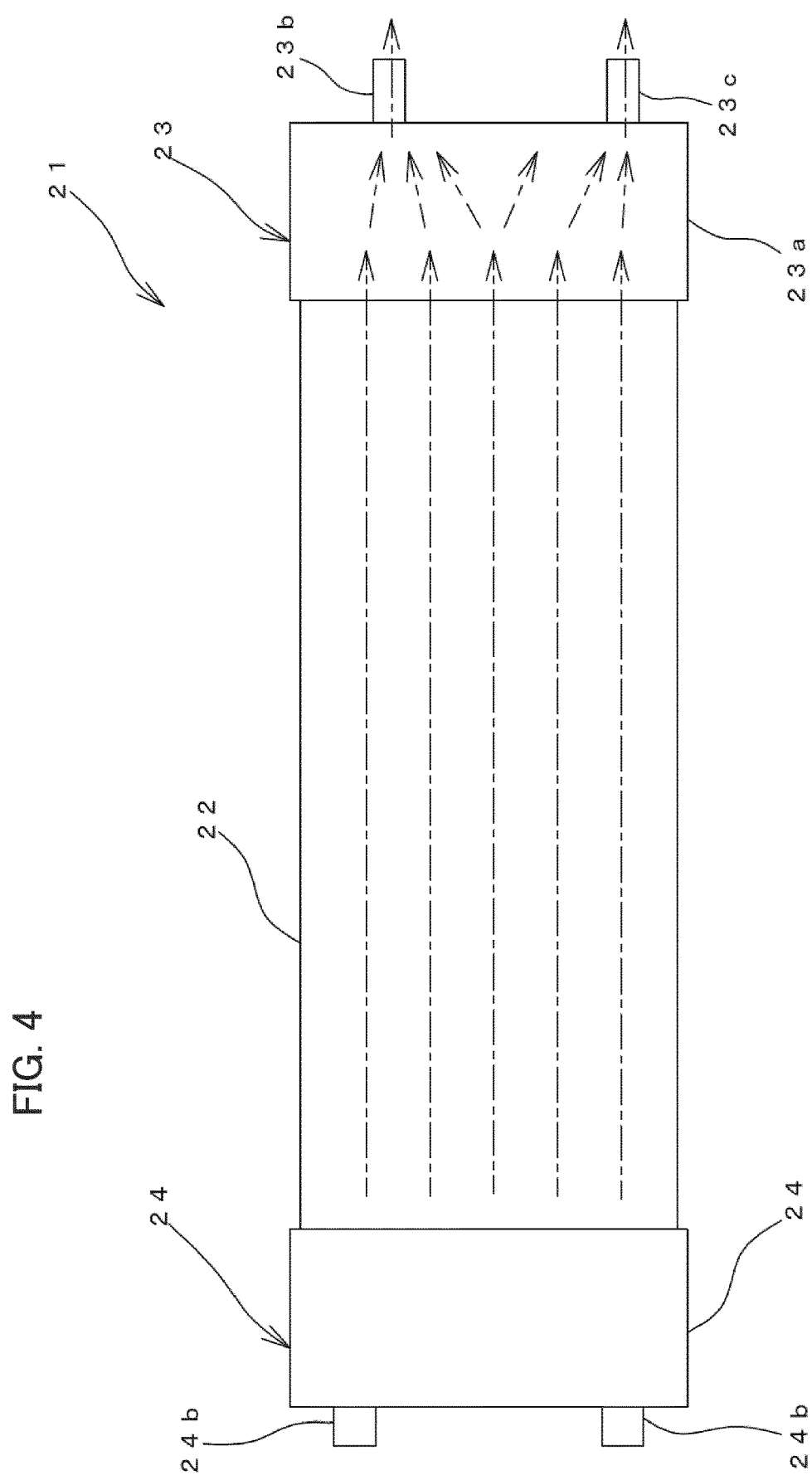
FIG. 4 is a side view illustrating the filtration membrane unit from a side.

FIG. 4 is a side view illustrating the filtration membrane unit 21 from the side. The shielding side socket 24 of the filtration membrane unit 21 includes a socket body 24a and two protrusions 24b. The socket body 24a includes a recess (not illustrated) into which an end on the other side (left side in FIG. 4) in the longitudinal direction (left-right direction in FIG. 4) of the filtration membrane 22 is inserted. Note that the socket body 24a does not include a flow path communicating with the recess. The suction force applied to the filtration membrane 22 is shielded by the shielding side socket 24 on the other side in the longitudinal direction of the filtration membrane 22.

Each of the two protrusions 24b in the shielding side socket 24 is positioned outside (left side in FIG. 4) the socket body 24a in the longitudinal direction (left-right direction in FIG. 4) of the filtration membrane 22 and is arranged along the extending direction of the socket body 24a (vertical direction in FIG. 4).

Figure 12:
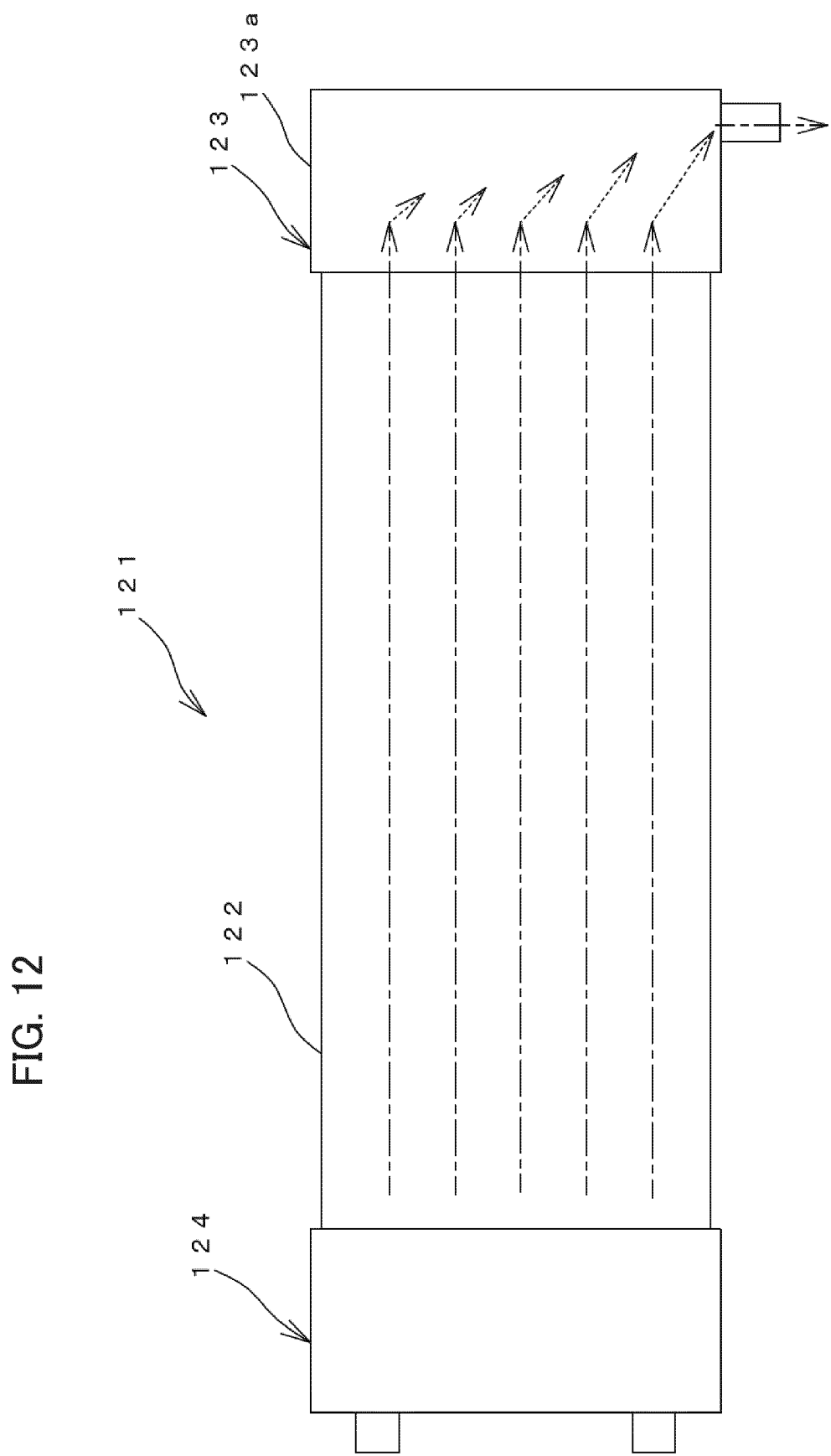
FIG. 12 is a side view illustrating a filtration membrane unit according to a first comparative example in which only one discharge port is disposed in a suction side socket, similarly to a filter unit described in Patent Literature 1.

FIG. 12 is a side view illustrating a filtration membrane unit 121 according to a first comparative example in which only one discharge port is disposed in a suction side socket 123, similarly to the filter unit described in Patent Literature 1. In FIG. 12, an arrow of a one-dot chain line indicates a flowing direction of the treated water. The discharge port is disposed at an end of a socket body 123a of the suction side socket 123 on the other side (lower side in FIG. 12) in the socket extending direction (vertical direction in FIG. 12).

In such a configuration, a stronger suction force (negative pressure) is applied to a region existing closer to the discharge port in each region in the lateral direction of a filtration membrane 122 (vertical direction in FIG. 12). Thus, the amount of filtrate per unit time in each of the above-described regions varies. Specifically, the amount of filtrate in a region closer to the discharge port among the above-described regions is larger. For this reason, clogging of the region existing closer to the discharge port progresses faster than clogging of a region existing at a position farther from the discharge port than the region. As a result, as compared with the filtration membrane unit in which variation in the amount of filtrate in each region is relatively small, the time interval of the filtration membrane cleaning operation performed to remove clogging is shortened, and maintainability is impaired.

On the other hand, in the filtration membrane unit 21 according to the embodiment, as illustrated in FIG. 4, the first protrusion 23b and the second protrusion 23c provided with the discharge port (first outlet 23b-2 and second outlet 23c-2 in FIG. 3) are arranged along the extending direction of the socket body 23a (vertical direction in FIG. 4). That is, the filtration membrane unit 21 includes two discharge ports arranged in the extending direction of the socket body 23a.

In such a configuration, a suction force is generated in each of the two discharge ports (first outlet 23b-2 and second outlet 23c-2 in FIG. 3) existing at different positions in the extending direction of the socket body 23a. Thus, as indicated by the one-dot chain line arrow in FIG. 4, the variation in the amount of filtrate in the lateral direction of the filtration membrane 22 is suppressed, and thus the amount of filtrate is equalized in the lateral direction of the filtration membrane 22. As a result, the time interval of the filtration membrane cleaning operation performed for removing clogging becomes longer, and maintainability is improved. Therefore, according to the filtration membrane unit 21 of the embodiment, maintainability of the filtration membrane 22 can be improved.

Hereinafter, the first outlet (23b-2 in FIG. 3) provided in the first protrusion 23b and the second outlet (23c-2 in FIG. 3) provided in the second protrusion 23c are collectively referred to as "two discharge ports of the suction side socket 23". When the diameter of the discharge port is set to a predetermined value and the amount of filtrate per unit time by the filtration membrane (22 or 122) is set to a predetermined value, it is necessary to employ the following condition as a condition of the flow rate per unit time of the treated water passing through the discharge port. That is, it is a condition that the inflow amount of the treated water into the discharge port of the filtration membrane unit 121 according to the first comparative example is set to about 2 times the inflow amount of the treated water into each of the "two discharge ports of the suction side socket 23" according to the embodiment. Under such conditions, the flow path resistance of the treated water in the filtration membrane unit 21 according to the embodiment is made smaller than that in the first comparative example, power of a suction power unit such as a suction pump (9 in FIG. 1) can be made smaller to achieve energy saving.

Unlike the aspect illustrated in FIG. 3, each of the first outlet (23b-2 in FIG. 3) and the second outlet (23c-2 in FIG. 3) may be disposed at a predetermined position on peripheral surfaces of the protrusions (23b and 23c) (hereinafter, this arrangement is referred to as circumferential surface arrangement). However, as illustrated in FIG. 3, it is more desirable to arrange each of the first outlet 23b-2 and the second outlet 23c-2 on the distal end surface of the protrusion (23b or 23c) (hereinafter, this arrangement is referred to as distal end surface arrangement). This is for the reason described below. That is, in the circumferential surface arrangement, the flow of the treated water in the hollow (23b-1 or 23c-1) of the protrusion (23b-2 or 23c-2) needs to be redirected at an angle of about 90 [°] immediately before reaching the discharge port (first outlet 23b-2 or second outlet 23c-2). This increases the flow path resistance of the filtration membrane unit 21. On the other hand, in the distal end surface arrangement, the flow direction of the treated water in the hollow (23b-1 or 23c-1) of the protrusion (23b-2 or 23c-2) and the flow direction of the treated water when passing through the discharge port (first outlet 23b-2 or second outlet 23c-2) are set to the same direction. Thus, unlike the circumferential surface arrangement, the flow of the treated water is not largely redirected in the hollow (23b-1 and 23c-1), so that the flow path resistance can be reduced as compared with the circumferential surface arrangement.

Figure 5:
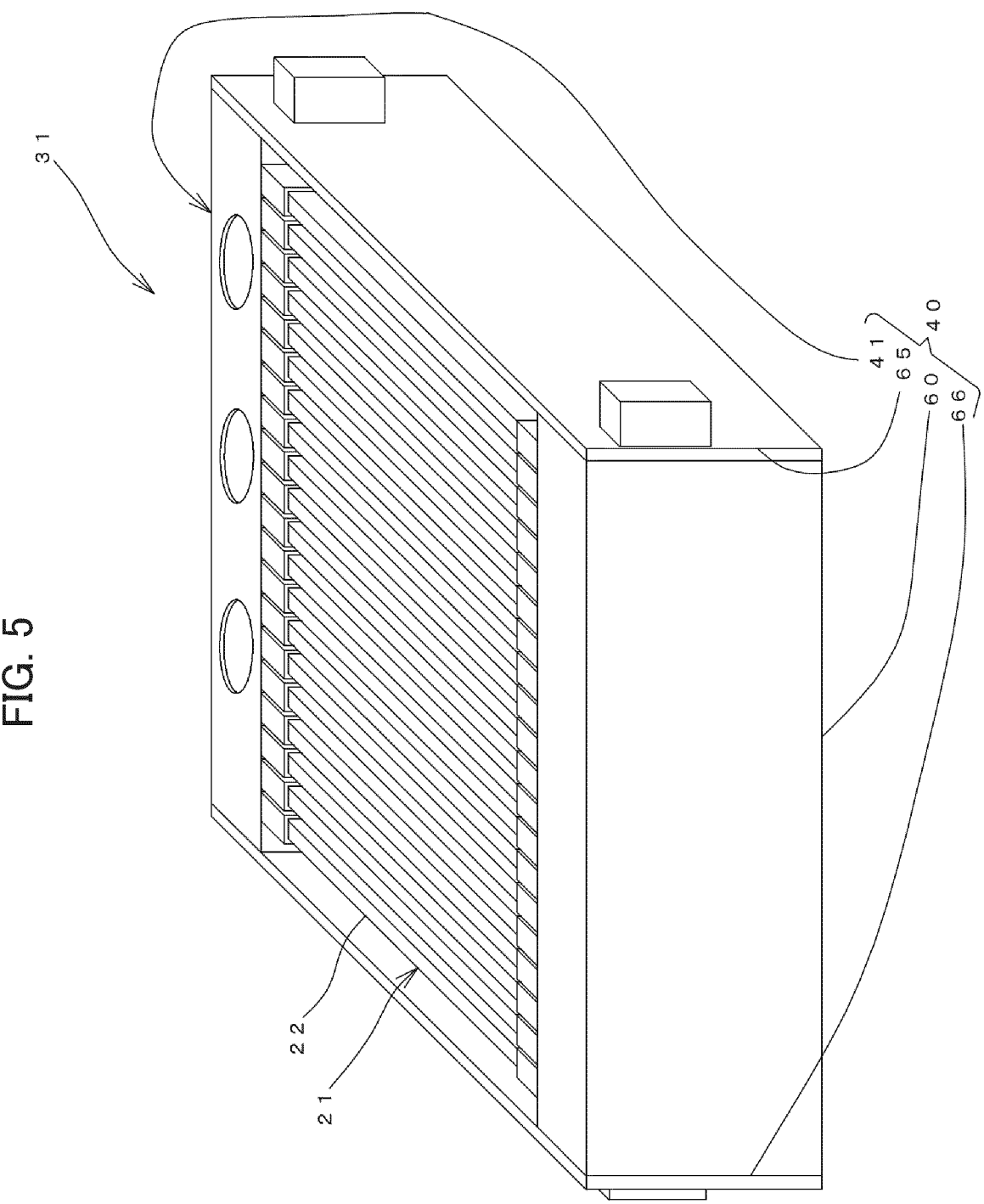
FIG. 5 is a perspective view illustrating a filtration system according to the embodiment.

FIG. 5 is a perspective view illustrating a filtration system 31 according to the embodiment. The filtration system 31 includes a plurality of filtration membrane units 21 and a holder 40 that holds the plurality of filtration membrane units 21. The holder 40 has a frame shape, and the holder 40 holds the plurality of filtration membrane units 21 in the frame. Further, the holder 40 includes a water collection cassette 41, a blind cassette 60, a first side cover 65, and a second side cover 66.

Figure 6:
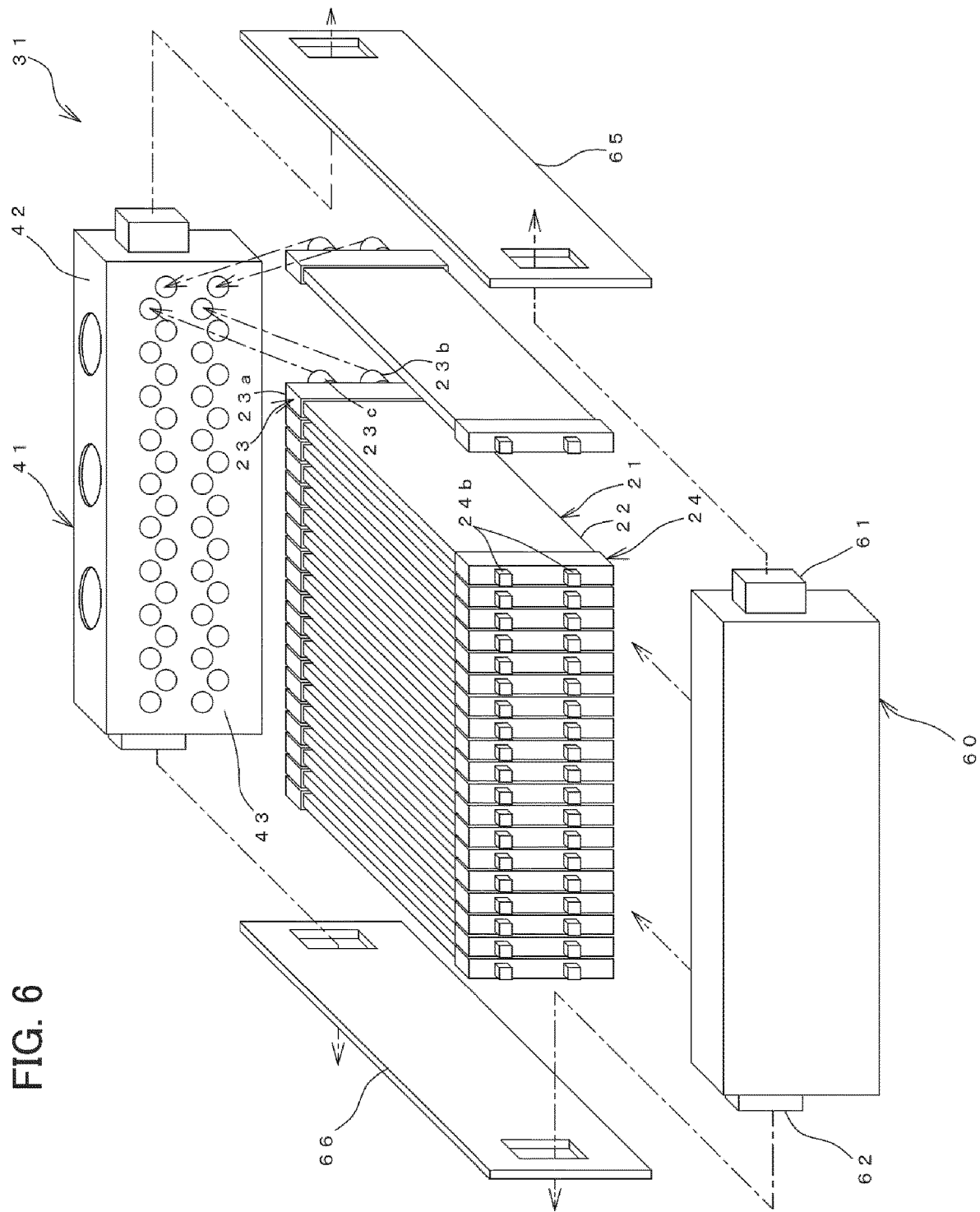
FIG. 6 is an exploded perspective view illustrating the filtration system.

FIG. 6 is an exploded perspective view illustrating the filtration system 31 according to the embodiment. The holder (40 in FIG. 5) is formed by combining a flat rectangular parallelepiped water collection cassette 41, a flat plate-shaped first side cover 65, a flat rectangular parallelepiped blind cassette 60, and a flat plate-shaped second side cover 66 in a frame shape. Unlike the state illustrated in the drawing, in a state where the plurality of filtration membrane units 21 does not exist, the water collection cassette 41 and the blind cassette 60 face each other. In addition, in the above state, the first side cover 65 and the second side cover 66 face each other in a direction orthogonal to a facing direction of the water collection cassette 41 and the blind cassette 60.

Each of the water collection cassette 41 and the blind cassette 60 is disposed so that the longitudinal direction thereof is along a facing direction of the first side cover 65 and the second side cover 66. On the other hand, each of the first side cover 65 and the second side cover 66 is disposed so that the longitudinal direction thereof is along a facing direction of the water collection cassette 41 and the blind cassette 60.

Figure 7:
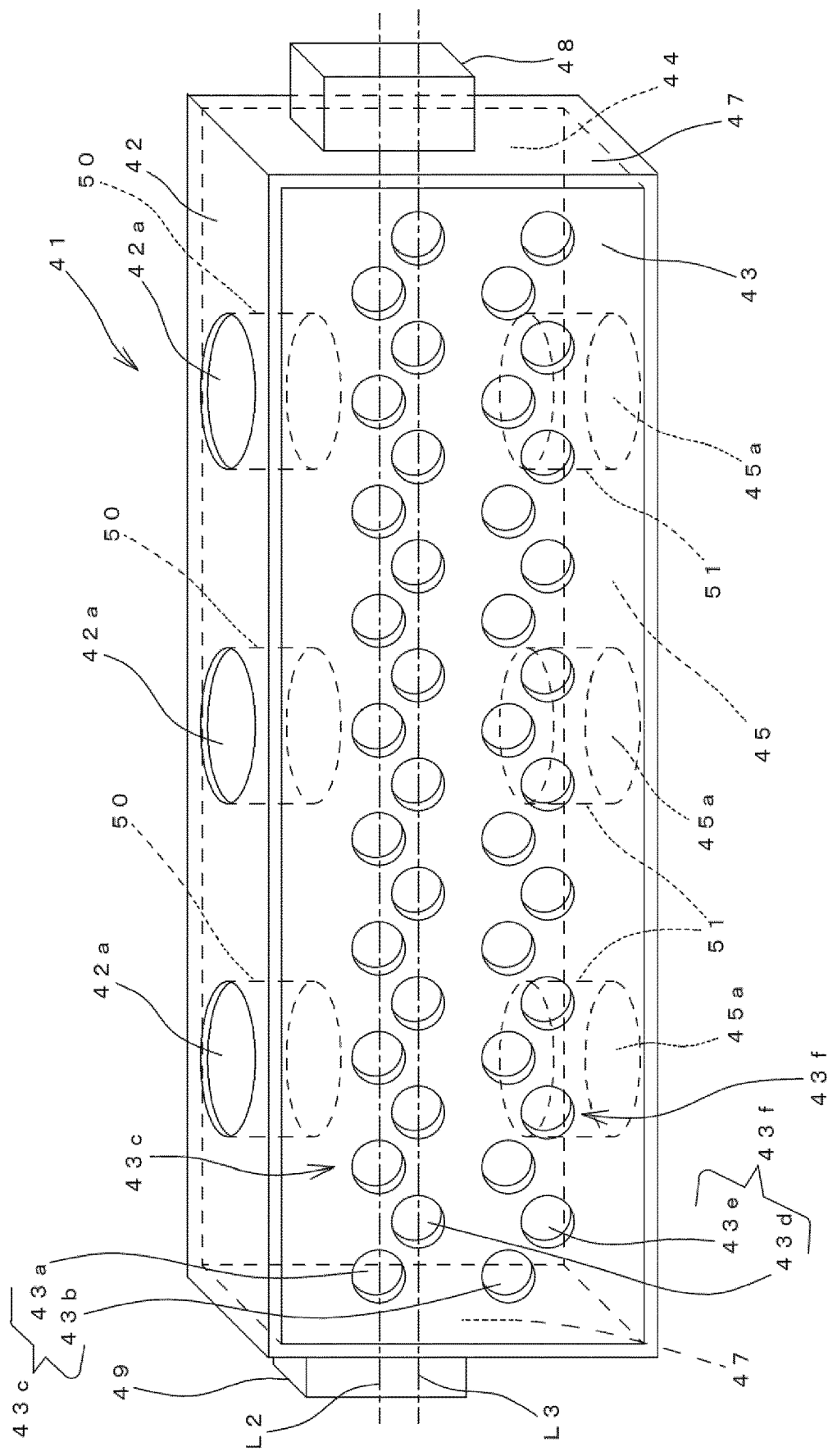
FIG. 7 is a perspective view illustrating a water collection cassette of a holder according to the embodiment.

FIG. 7 is a perspective view illustrating the water collection cassette 41 of the holder (40 in FIG. 5). The water collection cassette 41 is formed by combining a top plate 42, a bottom plate 45, a first long side plate 43, a second long side plate 44, and a first short side plate 46 and a second short side plate 47 shorter than the long side plates (43 and 44) in a flat rectangular parallelepiped shape. The top plate 42 and the bottom plate 45 face each other. In the water treatment facility, as illustrated in the drawing, the water collection cassette 41 is arranged in such a mode that the top plate 42 and the bottom plate 45 are arranged in the vertical direction along the gravity direction.

Each of the first long side plate 43 and the second long side plate 44 is arranged in such a mode that the longitudinal direction thereof is along the lateral direction of each of the first short side plate 46 and the second short side plate 47. On the other hand, each of the first short side plate 46 and the second short side plate 47 is arranged in such a mode that the longitudinal direction thereof is along a facing direction of the top plate 42 and the bottom plate 45.

A first fixing portion 48 protruding from the front surface is provided on the front surface of the first short side plate 46. Further, a second fixing portion 49 protruding from the front surface is provided on the front surface of the second short side plate 47.

Hereinafter, the frame structure of the frame-shaped holder (40 in FIG. 5) will be simply referred to as a "frame". The first long side plate 43 is located inside the "frame" with respect to the second long side plate 44. The first long side plate 43 functions as a side plate that holds one end in the longitudinal direction of the filtration membrane unit (21 in FIG. 6).

The first long side plate 43 includes a plurality of hole pairs including an insertion hole into which one of the first protrusion (23b in FIG. 3) and the second protrusion (23 c in FIG. 3) is inserted and an insertion hole into which the other of the first protrusion and the second protrusion that is not inserted into the insertion hole is inserted. In each of the plurality of hole pairs, a distance between the two insertion holes is the same.

As illustrated in FIG. 6, the two insertion holes of the hole pair are arranged in the lateral direction (vertical direction in FIG. 6) of the first long side plate 43. Any one of the first protrusion 23b and the second protrusion 23c is inserted into any one of the two insertion holes of the hole pair, and the other protrusion is inserted into the other insertion hole, which allows the following description. That is, while one end in the longitudinal direction of the filtration membrane unit (21 in FIG. 6) is positioned on the surface of the first long side plate 43, the one end can be held by the first long side plate 43.

As illustrated in FIG. 2, the shape of each of the two protrusions 24b of the shielding side socket 24 is a cube shape or a rectangular parallelepiped shape. The two protrusions 24b position the other end in the longitudinal direction of the filtration membrane unit (21 in FIG. 6) to the blind cassette (60 in FIG. 6), and hold the other end to the blind cassette.

In the suction side socket 23, each of the two protrusions (23b and 23c) integrally formed with the socket body 23a has a tubular shape.

Hereinafter, in each member, a length in a direction along a thickness direction of the flat plate-shaped filtration membrane 22 is referred to as a width. In order to efficiently draw out the filtration performance of the filtration membrane 22, it is desirable that the inner diameters of the two protrusions (23b and 23c) of the suction side socket 23 is the same as the width of the filtration membrane 22. Then, as illustrated in FIG. 2, the tubular peripheral wall of each of the two protrusions (23b23c) protrudes from the socket body 23a in the width direction. That is, outer diameters of the two protrusions (23b and 23c) are larger than a width of the socket body 23a.

Such a configuration makes it difficult to reduce the size of the filtration system (31 in FIG. 5). Specifically, in order to miniaturize the filtration system, it is desirable to minimize the arrangement pitch in the arrangement direction of the plurality of filtration membrane units (21 in FIG. 6). The narrowing of the arrangement pitch described above is restricted by the outer diameter of each of the two protrusions (23b and 23c) of suction side socket 23.

The reason why the narrowing of the arrangement pitch described above is restricted by the outer diameters of the protrusions (23b and 23c) is as follows. That is, in each of the plurality of hole pairs provided in the first long side plate (43 in FIG. 7), the insertion holes located on one side in the lateral direction of the first long side plate (43) out of the two insertion holes are arranged along the longitudinal direction of the first long side plate (43). In addition, in each of the plurality of hole pairs, out of the two insertion holes, the insertion hole located on the other side in the lateral direction of the first long side plate (43) is also arranged along the longitudinal direction of the first long side plate (43). Hereinafter, two insertion holes adjacent to each other along the longitudinal direction are referred to as "two adjacent insertion holes". Due to downsizing of the filtration system (31 in FIG. 5), as the arrangement pitch (arrangement pitch along the longitudinal direction of the first long side plate 43) of the plurality of filtration membrane units (21 in FIG. 6) decreases, the distance between the "two adjacent insertion holes" decreases. When this distance becomes excessively short, an inter-hole length of an inter-hole portion (portion between the "two adjacent insertion holes") of the first long side plate (43) becomes excessively short, and necessary strength cannot be obtained in the inter-hole portion. In the above-described inter-hole portion of the first long side plate (43), the inter-hole length (narrow limit value) at which the minimum strength can be obtained is constant as long as the material and thickness of the first long side plate (43) are the same. On the other hand, even when the arrangement pitches of the plurality of filtration membrane units 21 are the same, if the outer diameters of the protrusions (23b and 23c) are different, the above-mentioned inter-hole lengths are different. As the outer diameter of the protrusion (23b or 23c) increases, the inter-hole length decreases (strength of the inter-hole portion decreases). Therefore, the narrowing of the arrangement pitch of the insertion holes is restricted by the outer diameter of the protrusion (23b and 23c).

Thus, in the suction side socket (23) of the filtration membrane unit 21 according to the embodiment, each of the two protrusions (23b and 23c) is arranged in a mode illustrated in FIG. 3. Specifically, it is a mode in which a distance α from the center in the extending direction of the socket body 23a (position indicated by a one-dot chain line dash line L1) to the first protrusion 23b and a distance β from the center to the second protrusion 23c are different from each other (α<β). In such a configuration, while the inter-hole length of the inter-hole portion of the first long side plate (43) is narrowed to the narrow limit value, the arrangement pitch of the plurality of filtration membrane units (21) can be reduced as compared with the case where the distance α and the distance β are the same as each other.

The reason why the above-described effect can be exhibited is as described below. That is, there are two types of the plurality of hole pairs provided in the first long side plate 43 illustrated in FIG. 7. Among the plurality of hole pairs, a first type hole pair 43c is classified as the first type, and a second type hole pair 43f is classified as the second type. The first type hole pair 43c and the second type hole pair 43f are alternately arranged along the longitudinal direction (vertical direction in FIG. 7) of the first long side plate 43. The distance between the two insertion holes (43a and 43b) in the first type hole pair 43c and the distance between the two insertion holes (43d and 43e) in the second type hole pair 43f are the same. Of the two insertion holes (43a and 43b) of the first type hole pair 43c, the insertion hole 43a located on one side (upper side in FIG. 7) in the lateral direction of the first long side plate 43 is disposed at a predetermined first position along the lateral direction of the first long side plate 43 in the plane of the first long side plate 43. This first position is indicated by a one-dot chain line L2 in FIG. 7. Of the two insertion holes (43d and 43e) of the second type hole pair 43f, the insertion hole 43d located on one side (upper side in FIG. 7) in the lateral direction of the first long side plate 43 is disposed at a predetermined second position along the lateral direction of the first long side plate 43 in the plane of the first long side plate 43. This second position is indicated by a one-dot chain line L3 in FIG. 7. In the lateral direction of the first long side plate 43, the first position and the second position are different from each other.

The two protrusions (23b and 23c) of the filtration membrane unit (21) taking a predetermined first posture are inserted into the first type hole pair 43c. On the other hand, the two protrusions (23b and 23c) of the filtration membrane unit (21) taking a predetermined second posture are inserted into the second type hole pair 43f. The filtration membrane unit (21) taking the first posture and the filtration membrane unit (21) taking the second posture are at point-symmetrical positions (positions rotated by) 180° with respect to an axis (one-dot chain line L4 in FIG. 2) passing through the center in the extending direction of the suction side socket (23) and the center in the extending direction of the shielding side socket (24).

Hereinafter, in each member, a positional deviation along the lateral direction of the first long side plate 43 is simply referred to as a positional deviation. The insertion hole 43a arranged at the above-described first position (one-dot chain line 12) of the two insertion holes (43a and 43b) of the first type hole pair 43c and the insertion hole 43e arranged at the above-described second position (dashed-dotted line L2) of the two insertion holes (43d and 43e) of the second type hole pair 43f are positionally deviated from each other. One of the two adjacent filtration membrane units (21) inserts the two protrusions (23b and 23c) of the suction side socket (23) into the two insertion holes (43a and 43b) of the first type hole pair 43c. In the other filtration membrane unit (21), the two protrusions (23b and 23c) of the suction side socket (23) are inserted into the two insertion holes (43d and 43e) of the second type hole pair.

In such a configuration, in the longitudinal direction of the first long side plate 43, it is possible to secure the inter-hole portion of the first long side plate 43 while the end on the other side of the adjacent insertion hole located on one side of the "two adjacent insertion holes" is located on the other side of the end on one side of the adjacent insertion hole located on the other side. More specifically, in FIG. 7, since the longitudinal direction of the first long side plate 43 is substantially along the left-right direction in FIG. 7 (strictly speaking, the longitudinal direction is slightly inclined from the left-right direction in FIG. 7), the longitudinal direction of the first long side plate 43 will be described below as the left-right direction in FIG. 7. For example, among the plurality of hole pairs provided in the first long side plate 43, the insertion hole 43a of the first type hole pair 43c located on the leftmost side in the left-right direction in the drawing and the insertion hole 43d of the second type hole pair 43f adjacent thereto on the right side in the left-right direction will be focused as "two adjacent insertion holes". The insertion hole 43a of the first type hole pair 43c is located on the left side in the left-right direction in the drawing with respect to the insertion hole 43d of the second type hole pair 43f. That is, attention is paid to an example in which the insertion hole 43a of the first type hole pair 43c is an adjacent insertion hole located on the other side in the longitudinal direction of the first long side plate 43 out of "two adjacent insertion holes", and the insertion hole 43d of the second type hole pair 43f is an adjacent insertion hole located on one side in the longitudinal direction. In this example, the left end (other side) of the insertion hole 43d of the second type hole pair 43f is positioned on the left side of the right end (one side) of the insertion hole 43a of the first type hole pair 43c. In the first long side plate 43, an inter-hole portion between the insertion hole 43a and the insertion hole 43d is secured while maintaining such a positional relationship. As the amount of the positional deviation between the insertion hole 43a and the insertion hole 43d increases, the inter-hole length of the above-described inter-hole portion increases. Therefore, even if the diameter of the two protrusions (23b and 23c) of the suction side socket (23) is increased or the arrangement pitch of the plurality of filtration membrane units (21) is reduced, the inter-hole length can be made equal to or more than the narrow limit value by further increasing the positional deviation amount described above.

Therefore, with the filtration system 31, the arrangement pitch of the plurality of filtration membrane units 21 can be narrowed without causing the positional deviation of the plurality of filtration membrane units 21 (positional deviation along the lateral direction of the first long side plate 43), and the filtration system 31 can be downsized. In addition, with the filtration system 31, the diameter of the two protrusions (23b and 23c) of the suction side socket (23) can be increased to improve the filtration performance of the filtration membrane 22.

The blind cassette 60 illustrated in FIG. 6 includes a plurality of shielding side insertion holes (not illustrated) on a surface facing the plurality of filtration membrane units 21. These shielding side insertion holes are insertion holes for inserting the protrusion 24b of the shielding side socket 24 of the filtration membrane unit 21. When each of the two protrusions 24b of the shielding side socket 24 is inserted into the shielding side insertion hole provided in the facing surface, the end on the other side in the longitudinal direction of the filtration membrane unit 21 is positioned with respect to the blind cassette 60. In addition, the end on the other side in the longitudinal direction of the filtration membrane unit 21 is held by the blind cassette 60.

Note that, although the example in which the plurality of shielding side insertion holes is arranged on the surface of the blind cassette 60 facing the plurality of filtration membrane units 21 and the two protrusions 24b are provided in the shielding side socket 24 of the filtration membrane unit 21 has been described, the shielding side insertion holes and the protrusions 24b may be omitted. In this case, for example, by using the following rubber member, it is possible to hold the end on the other side (shielding side) in the longitudinal direction in each of the plurality of filtration membrane units 21. That is, it is a rubber member including a base plate extending along the longitudinal direction of the blind cassette 60 and a plurality of partition plates protruding from the surface of the base plate and arranged at a predetermined arrangement pitch along the longitudinal direction of the blind cassette 60. The shielding side socket 24 of the filtration membrane unit 21 may be sandwiched between two partition plates adjacent to each other in the rubber member.

In addition, an example in which the shape of the filtration membrane 22 is a flat plate shape has been described, but the shape of the filtration membrane 22 is not limited to the flat plate shape, and may be, for example, a corrugated plate shape.

Stress is applied to the filtration membrane unit 21 by a flow of the raw water ($W_1$) existing around the filtration membrane unit 21, bubbles released from the bubble generation device 90, and the like. Due to this stress, a force (skew force) is applied to the filtration membrane unit 21 so that the lateral direction of the filtration membrane 22 is inclined from the lateral direction (vertical direction in FIG. 6) of each of the water collection cassette 41 and the blind cassette 60. By this skew force, a large force is applied to a region of the entire filtration membrane 22 close to the first protrusion 23b of the suction side socket 23, a region of the suction side socket close to the second protrusion 23c, and a region of the shielding side socket 24 close to the two protrusions 24b. Hereinafter, the above-described four regions are collectively referred to as a region near the protrusion.

As illustrated in FIG. 3, the first protrusion 23b of suction side socket 23 is located on one side (upper side in FIG. 3) of the second protrusion 23c in the extending direction of the socket body 23a (vertical direction in FIG. 3). The first protrusion 23b exists at a position deviated to the other side (lower side in the drawing) from an end on one side (upper end in the drawing) in the extending direction of the socket body 23a (hereinafter, the deviation amount is referred to as a "first deviation amount"). Further, the second protrusion 23c exists at a position deviated to one side (upper side in the drawing) from the other end (lower end in the drawing) in the extending direction of the socket body 23a (hereinafter, the deviation amount is referred to as a "second deviation amount").

Hereinafter, of the two protrusions 24b provided on the shielding side socket 24, the one located on one side (upper side in the drawing) in the extending direction of the socket body (24a) (vertical direction in the drawing) is referred to as a "protrusion 24b on one side". Further, of the two protrusions 24b, the one located on the other side (lower side in the drawing) in the extending direction is referred to as "the protrusion 24b on the other side". The "protrusion 24b on one side" exists at a position deviated to the other side (lower side in the drawing) from an end on one side (upper end in the drawing) in the extending direction of the socket body (24a) (hereinafter, the deviation amount is referred to as a "third deviation amount"). Further, the "protrusion 24b on the other side" exists at a position deviated to one side (upper side in the drawing) from the end on the other side (lower end in the drawing) in the extending direction of the socket body (24a) (hereinafter, the deviation amount is referred to as a "fourth deviation amount".

A second comparative example different from the example illustrated in FIG. 3 will be examined as a comparison target with the example illustrated in FIG. 3. In the second comparative example, the first protrusion 23*b* of the suction side socket 23 is located at end on one side (upper end in the drawing) in the extending direction of the socket body 23*a*. Further, the second protrusion 23*c* of the suction side socket 23 is located at the other end (lower end in the drawing) in the extending direction of the socket body 23*a*.

In the shielding side socket 24 of the second comparative example, the "protrusion 24*b* on one side" is located at an end on one side (upper end in the drawing) in the extending direction of the socket body (24*a*). Further, the "protrusion 24*b* on the other side" is located at an end on the other side (a lower end in the drawing) in the extending direction of socket body (24*a*).

That is, in the second comparative example, the "first deviation amount", the "second deviation amount", the "third deviation amount", and the "fourth deviation amount" are all zero. In the second comparative example having such a configuration, the distance between the first protrusion 24*b* and the second protrusion 24*c* of the suction side socket 23 is longer than the same distance in the filtration membrane unit 21 according to the embodiment. In addition, in the second comparative example, the distance between the "protrusion 24*b* on one side" and the "protrusion 24*b* on the other side" of the shielding side socket 24 is longer than the same distance in the filtration membrane unit 21 according to the embodiment. Thus, in the second comparative example, the force applied to the region near the protrusion of the filtration membrane 22 is larger than that of the filtration membrane unit 21 according to the embodiment by the principle of leverage, so that the filtration membrane 22 is easily damaged. In other words, the filtration membrane unit 21 according to the embodiment can suppress damage of the filtration membrane 22 caused by the skew force by not arranging each protrusion at the end in the extending direction of the socket.

In the filtration membrane unit 21 according to the embodiment, in order to efficiently suppress can suppress damage of the filtration membrane 22, it is desirable to make the "first deviation amount", the "second deviation amount", the "third deviation amount", and the "fourth deviation amount" as large as possible. However, in the suction side socket 23, when the "first deviation amount" and the "second deviation amount" are excessively increased, it is difficult to equalize the amount of collected water from the first protrusion 23*b* and the amount of collected water from the second protrusion 23*c*. In order to achieve the above-described uniformity, each of the "first deviation amount" and the "second deviation amount" is desirably set to $1/10$ or less of the length of the suction side socket 23 in the extending direction of the socket body 23*a*. More desirably, a range of $1/4$ to $1/3$ of the length of the suction side socket 23 in the extending direction of the socket body 23*a* is employed. The same applies to the "third deviation amount" and the "fourth deviation amount" in the shielding side socket 24.

Although the filtration system (31) employing a so-called single side pulling system in which only one side of both sides in the longitudinal direction of the filtration membrane 22 is a suction side has been described, a so-called double side pulling system in which both sides are suction sides may be employed. In this case, the suction side sockets 23 having a similar configuration may be provided as the sockets on both sides.

Figure 8:
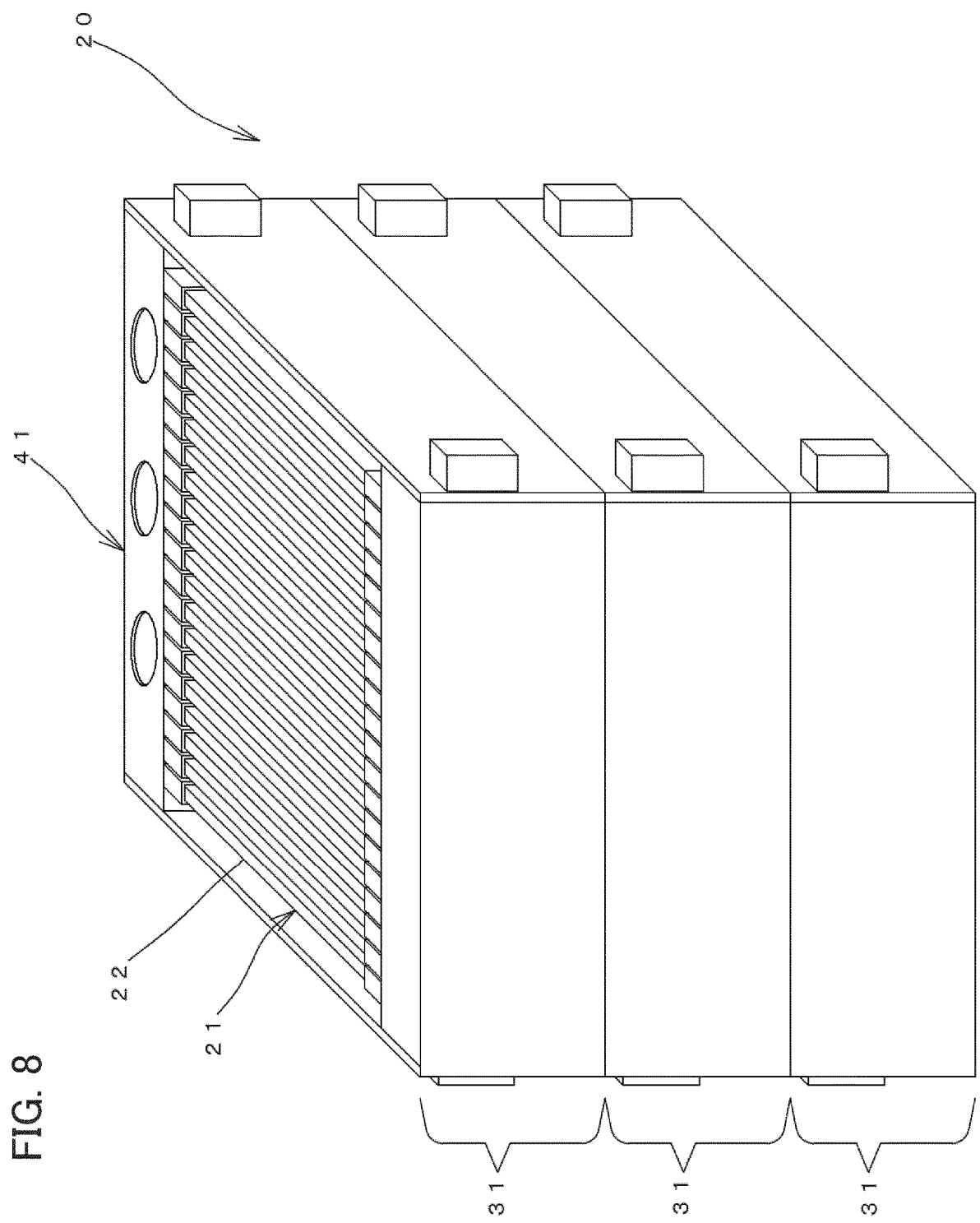
FIG. 8 is a perspective view illustrating a filtration treatment apparatus according to the embodiment.

FIG. 8 is a perspective view illustrating the filtration treatment apparatus 20 according to the embodiment. The filtration treatment apparatus 20 includes three filtration systems 31. The three filtration systems 31 are arranged along the lateral direction of the first long side plate (43). In the drawing, since the lateral direction is along the vertical direction, the structure of the filtration treatment apparatus 20 has a three-stage structure in which three filtration systems 31 are stacked in the vertical direction.

Figure 9:
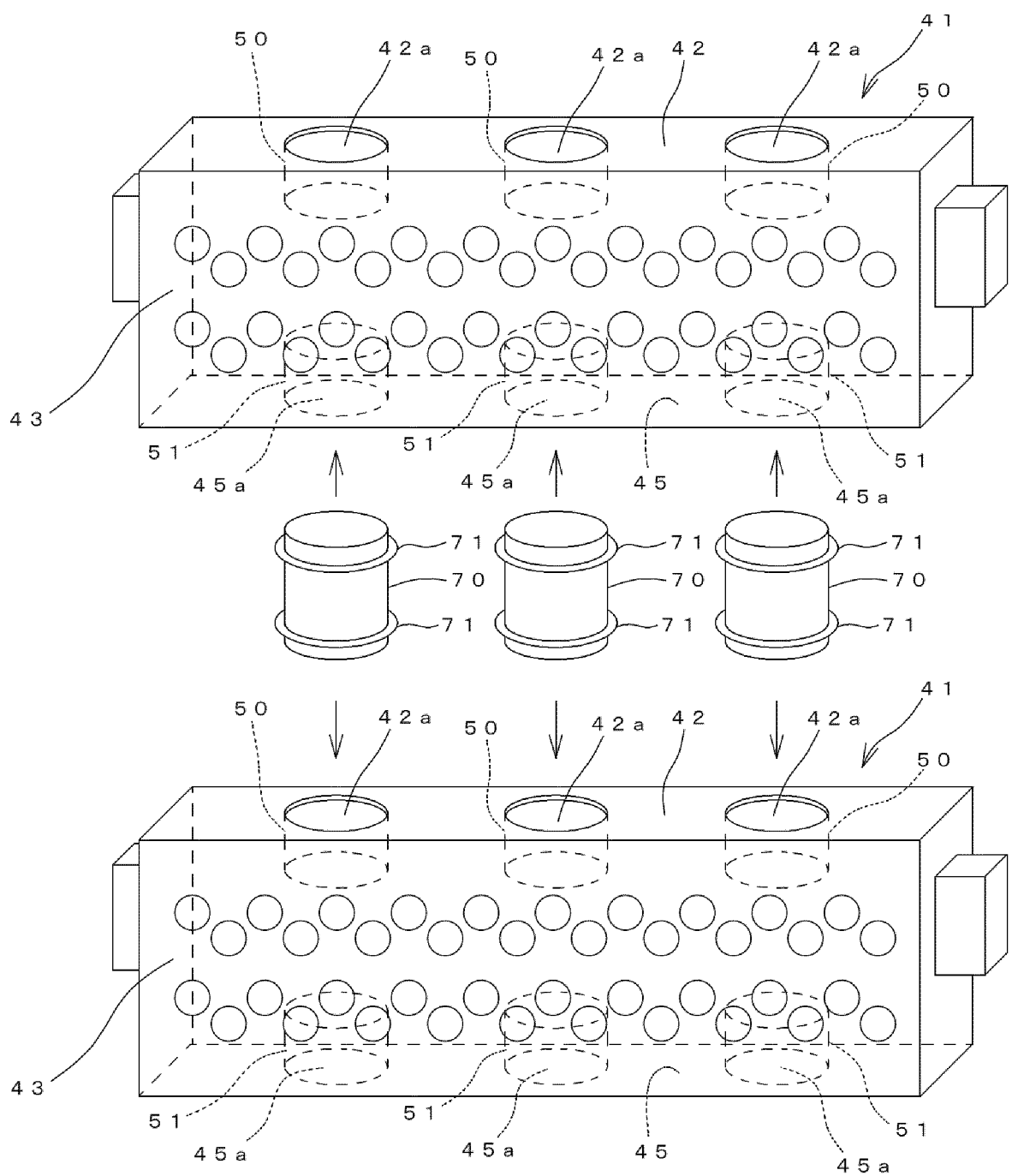
FIG. 9 is a perspective view illustrating an upper water collection cassette and a lower water collection cassette arranged in multiple stages in the filtration treatment apparatus, and connecting pipes connecting the cassettes.

FIG. 9 is a perspective view illustrating the water collection cassette 41 of the filtration system (31) arranged on one side (upper side in the drawing) in the lateral direction of the first long side plate (43), the water collection cassette 41 of the filtration system (31) arranged on the other side (lower side in the drawing) in the lateral direction, and connecting pipes 70. The connecting pipes 70 serve to connect the two water collection cassettes 41. On the top plate 42 of each of the two water collection cassettes 41 illustrated in FIG. 9, three top plate openings 42*a* are arranged in a mode of being at predetermined intervals along the longitudinal direction of the top plate 42. The top plate opening 42*a* faces one side (upper side in the drawing) in the lateral direction (vertical direction in the drawing) of the first long side plate 43.

Three tubular first connection sockets 50 are disposed inside the water collection cassette 41. These first connection sockets 50 are fixed to a back surface of the top plate 42 and communicate with the top plate opening 42*a*.

On the bottom plate 45 of each of the three water collection cassettes 41, three bottom plate openings 45*a* are arranged in a mode of being aligned at predetermined intervals along the longitudinal direction of the bottom plate 45. The bottom plate openings 45*a* face the other side (lower side in the drawing) in the lateral direction of the first long side plate 43.

One of the three top plate openings 42*a* and one of the three bottom plate openings 45*a* face each other along the lateral direction of the first long side plate 43. The other one of the three top plate openings 42*a* and the other one of the three bottom plate openings 45*a* face each other along the lateral direction. Furthermore, the last one of the three top plate openings 42*a* and the last one of the three bottom plate openings 45*a* face each other along the lateral direction.

Three tubular second connection sockets 51 are disposed inside the water collection cassette 41. These second connection sockets 51 are fixed to the back surface of the bottom plate 45 and communicate with the bottom plate openings 45*a*.

The water collection cassette 41 arranged on the lower side of the drawing and the water collection cassette 41 arranged on the upper side of the drawing are connected by three connecting pipes 70. The connecting pipes 70 are arranged in such a mode that a pipe length direction is along the lateral direction (vertical direction in the drawing) of the first long side plate 43. At each of one end and the other end in the lateral direction of the connecting pipe 70, a ring-shaped recess (not illustrated) extending over the entire circumference of the pipe circumferential surface is disposed, and an O-ring 71 is fitted into each of the ring-shaped recesses.

An end on one side (upper side in the drawing) in the lateral direction of the connecting pipe 70 is inserted into the second connection socket 51 of the water collection cassette 41 on the upper side in the drawing. The other end (lower side in the drawing) of the connecting pipe 70 in the lateral direction is inserted into the first connection socket 50 of the water collection cassette 41 on the upper side in the drawing. The internal space of the water collection cassette 41 on the upper side in the drawing and the internal space of the water collection cassette 41 on the lower side in the drawing communicate with each other through the three connecting pipes 70.

Note that, in the lowermost water collection cassette 41 among the three water collection cassettes 41 stacked in three stages, the connecting pipe 70 is not inserted into each of the three second connection sockets 51, but a sealing plug (not illustrated) is inserted into each of the second connection sockets 51. Accordingly, it is possible to prevent the suction force generated in the internal space of the lowermost water collection cassette 41 from leaking to the outside through the second connection socket 51.

Further, among the three water collection cassettes 41 stacked in three stages, in the uppermost water collection cassette 41, the water collection branch pipe is inserted instead of the connecting pipes 70 being inserted into the three first connection sockets 50. These water collection branch pipes are connected to one treated water transfer pipe (8 in FIG. 1).

Treated water having passed through the filtration membranes of the plurality of filtration membrane units (not illustrated) held by the first long side plate 43 of the water collection cassette 41 flows into the internal space of the water collection cassette 41 on the lower side in the drawing. In addition, the treated water having passed through the filtration membranes of the plurality of filtration membrane units (not illustrated) held by the first long side plate 43 of the water collection cassette 41 flows into the internal space of the water collection cassette 41 on the upper side of the drawing. The treated water present in the internal space of the water collection cassette 41 on the lower side in the drawing is sucked into the internal space of the water collection cassette 41 on the upper side through the connecting pipes 70 by the suction force generated inside the connecting pipes 70.

That is, in each of the three filtration systems 31 illustrated in FIG. 8, the treated water that has passed through each of the plurality of filtration membranes 22 is collected in the water collection cassette 41. Then, in each of the water collection cassettes 41 of the three filtration systems 31, the treated water in the internal space of the water collection cassette 41 located on the lower side is sucked into the internal space of the water collection cassette 41 located on the upper side. As a result, the treated water collected in the internal space of each of the three water collection cassettes 41 is finally collected in the internal space of the uppermost water collection cassette 41 and then transferred to the treated water tank (3 in FIG. 1).

In the connecting pipe 70 illustrated in FIG. 9, as described above, the pipe length direction is along the lateral direction of the first long side plate 43. The O-ring 71 fitted into the end on one side (upper side in the drawing) in the lateral direction of the connecting pipe 70 prevents the end inserted into the second connection socket 51 from coming off from the second connection socket 51, and improves sealability between the end and the second connection socket 51. A plurality of O-rings 71 arranged in the lateral direction may be fitted into the end in order to more reliably avoid the above-described disengagement and to further improve the above-described sealability.

The O-ring 71 fitted into the other end (lower side in the drawing) in the lateral direction of the connecting pipe 70 prevents the end inserted into the first connection socket 50 from coming off from the first connection socket 50, and improves sealability between the end and the first connection socket 50. A plurality of O-rings 71 arranged in the lateral direction may be fitted into the end in order to more reliably avoid the above-described disengagement and to further improve the above-described sealability.

The number of the top plate openings 42a, the bottom plate openings 45a, the first connection sockets 50, the second connection sockets 51, or the connecting pipes 70 is not limited to three. The number may be one or more.

In the filter unit described in Patent Literature 1, a filtrate outlet as a discharge port faces a direction in which the filtrate is discharged along a lateral direction of the ceramic filter. A filtration system as a filtration system including a plurality of filter units collects filtrate discharged from a filtrate outlet of each of the plurality of filter units by a filtrate collecting pipe. The filtrate collecting pipes are arranged in a mode of being aligned side by side along the lateral direction of the ceramic filter with respect to the plurality of filter units depending on the convenience of the discharge direction of the filtrate from the filtrate outlet. In such a configuration, when a multistage system in which a plurality of filtration systems is stacked in the vertical direction is employed, the height dimension of the filtration system is increased by the amount by which the filtrate collecting pipe is interposed between the filter units of the upper and lower filtration systems.

On the other hand, in the filtration treatment apparatus (20) according to the embodiment, each of the first outlet (23b-2) and the second outlet (23c-2) as discharge holes is directed in the direction of discharging the treated water along the longitudinal direction of the filtration membrane (22). In the filtration system (31) including the plurality of filtration membrane units (21), treated water discharged from the first outlet (23b-2) and the second outlet (23c-2) of each of the plurality of filtration membrane units (21) is collected by the water collection cassettes (41). The water collection cassettes (41) are arranged in a mode of being aligned side by side along the longitudinal direction of the filtration membrane (22) with respect to the plurality of filtration membrane units (21) depending on the convenience of the discharge direction of the treated water from each of the first outlet (23b-2) and the second outlet (23c-2). In such a configuration, even if a multi-stage system in which a plurality of filtration systems (31) is stacked in the vertical direction is employed, unlike the filtration system described in Patent Literature 1, a filtrate collecting pipe is not interposed between the respective filtration membrane units (21) in the upper and lower filtration systems (31). Thus, the height dimension of the filtration system (31) can be reduced by an amount by which the filtrate collecting pipe is not interposed between the filtration membrane units (21) in the upper and lower filtration systems (31), and downsizing in the height direction of the filtration treatment apparatus (20) can be achieved.

Although the filtration treatment apparatus (20) in which the plurality of filtration systems (31) is stacked in multiple stages has been described, a multiple system in which the plurality of filtration systems (31) is connected in a horizontal system may be employed. In addition, both the multistage method and the multiple method may be employed.

Next, an example in which a more characteristic configuration is added to the filtration treatment apparatus (20) according to the embodiment will be described. Note that the configuration of the filtration treatment apparatus (20) according to the example is the same as that of the embodiment unless otherwise noted.

It is assumed that the filtration system (31) of the filtration treatment apparatus (20) according to the example is vertically inverted. As described above, the insertion holes are arranged so that the two-dimensional layout of the insertion holes on the plane of the first long side plate (43) of the water collection cassette (41) is the same as that before the vertical inversion even if the posture of the filtration system (31) is inverted. In the water collection cassette (41), the plate material functioning as the top plate (42) before the vertical inversion functions as the bottom plate (45) after the vertical inversion, and the plate material functioning as the bottom plate (45) before the vertical inversion functions as the top plate (42) after the vertical inversion. In a region from one end to the other end in the longitudinal direction of the water collection cassette (41), relative positions of the three top plate openings (42a) of the top plate (42) before the vertical inversion and relative positions of the three top plate openings (42a) of the top plate (42) after the vertical inversion are the same. Therefore, in the region from one end to the other end in the longitudinal direction of the water collection cassette 41, relative positions of the three bottom plate openings (45a) of the bottom plate (45) before the vertical inversion and relative positions of the three bottom plate openings (45a) of the bottom plate (45) after the vertical inversion are the same. Therefore, in the filtration treatment apparatus (20) according to the example, the filtration system (31) can be handled without paying attention to the vertical posture of the filtration system (31).

Figure 10:
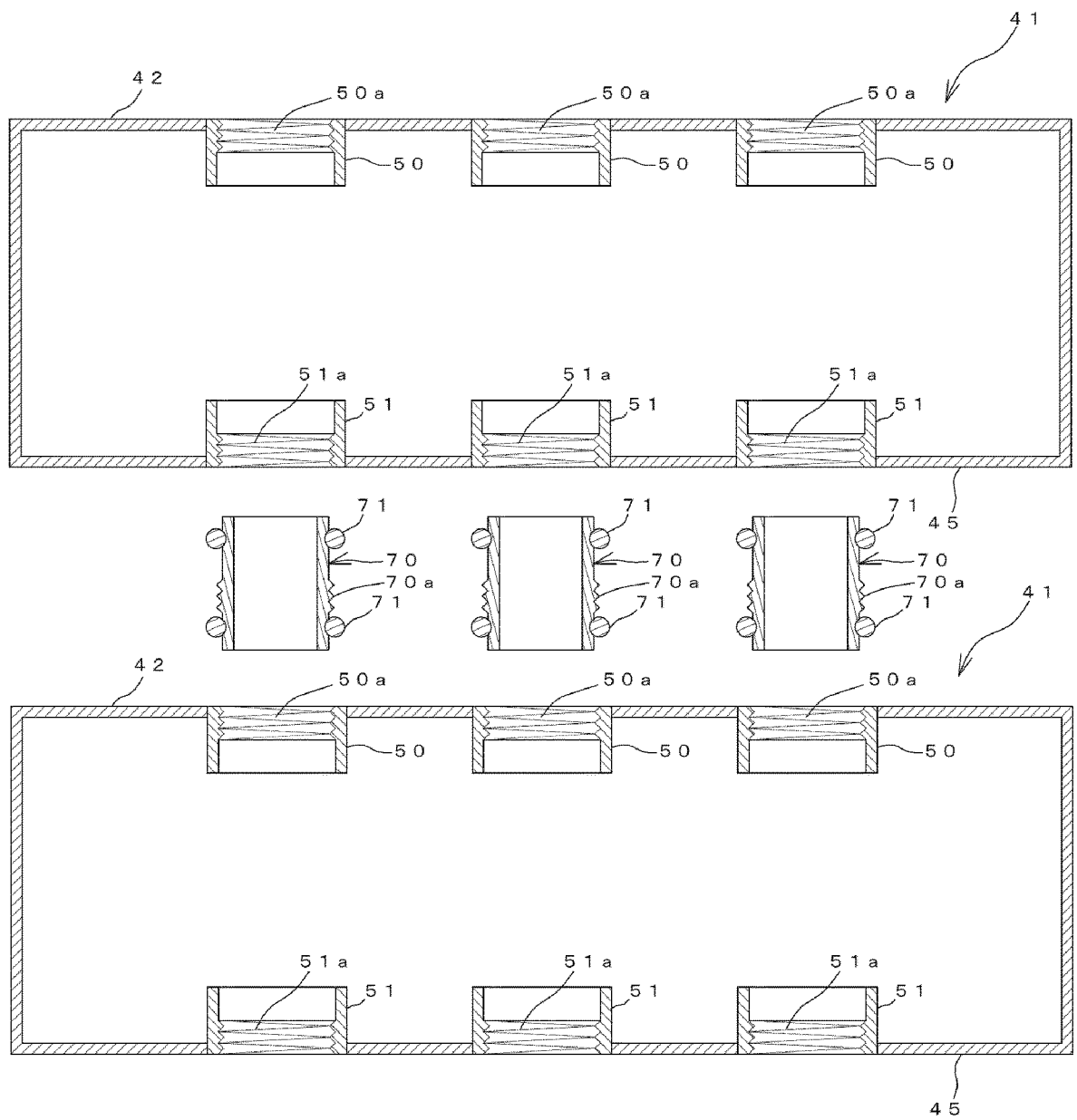
FIG. 10 is a cross-sectional view illustrating longitudinal cross sections of two water collection cassettes vertically stacked on each other in the filtration treatment apparatus according to the example together with cross sections of connecting pipes.
Figure 11:
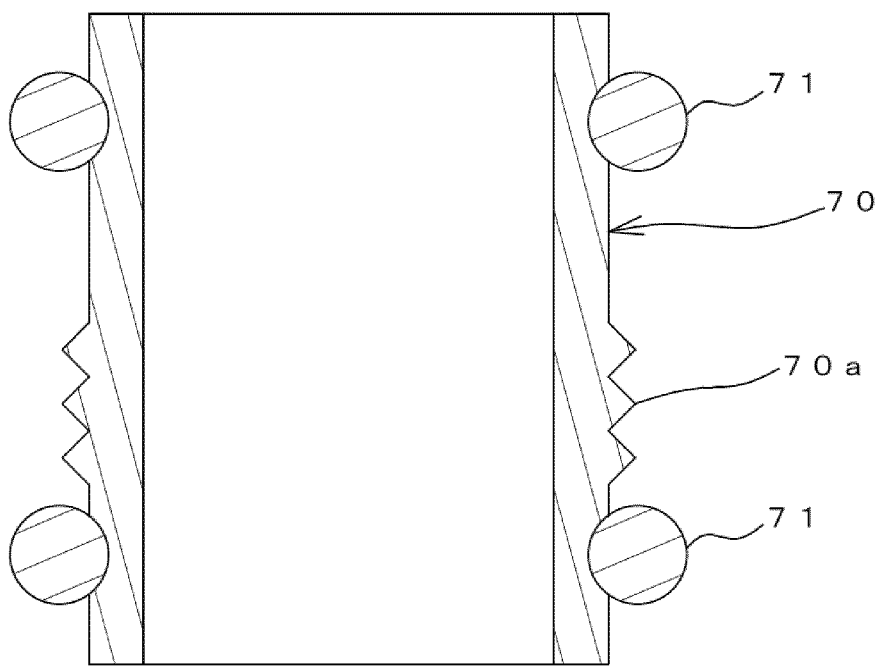
FIG. 11 is a cross-sectional view illustrating a cross section of a connecting pipe in an enlarged manner compared to FIG. 10.

FIG. 10 is a cross-sectional view illustrating longitudinal cross sections of two water collection cassettes 41 vertically stacked on each other in the filtration treatment apparatus (20) according to the example together with cross sections of the connecting pipes 70. FIG. 11 is a cross-sectional view illustrating a cross section of the connecting pipe 70 in an enlarged manner compared to FIG. 10.

As illustrated in FIG. 11, each of the three first connection sockets 50 fixed to the top plate 42 of the water collection cassette 41 includes a female screw portion 50a on the inner peripheral surface. The female screw portion 50a is provided in a region biased upward in the entire region in the pipe length direction of the first connection socket 50 made of a pipe material. Each of the three second connection sockets 51 fixed to the bottom plate 45 of the water collection cassette 41 includes a female screw portion 51a on the inner peripheral surface. The female screw portion 51a is provided in a region biased to the lower side in the entire region in the pipe length direction of the second connection socket 51 made of a pipe material.

When the posture of the water collection cassette 41 is vertically inverted, the plate material functioning as the top plate 42 before the vertical inversion functions as the bottom plate 45, and the pipe material functioning as the first connection socket 50 before the vertical inversion functions as the second connection socket 51. As illustrated in FIG. 11, the connecting pipe 70 includes a male screw portion 70a on the outer peripheral surface. The male screw portion 70a is provided in a region biased to one side in the entire region of the connecting pipe 70 in the pipe length direction. The connecting pipe 70 is used in a mode in which, of both ends of the connecting pipe 70 in the pipe length direction, the end including the male screw portion 70a is positioned below the other end.

In FIG. 10, each of the three connecting pipes 70 is inserted into the first connection socket 50 while screwing its own male screw portion 70a into the female screw portion 50a of the first connection socket 50 of the water collection cassette 41 positioned on the lower side out of the two water collection cassettes 41. With the above-described screw, the connecting pipe 70 can be prevented from coming off from the first connection socket 50. In addition, when the upper water collection cassette 41 and the lower water collection cassette 41 are separated for maintenance and inspection work, it is possible to reliably maintain a state in which each of the three connecting pipes 70 is held by the lower water collection cassette 41, and thus it is possible to improve workability of maintenance and inspection.

In the filtration treatment apparatus (20), the connecting pipe 70 is not inserted into the second connection socket 51 in the water collection cassette 41 of the lowermost filtration system (31) among the three filtration systems (31) stacked in three layers. Instead, a sealing plug (not illustrated) having a male screw portion on an outer peripheral surface is inserted into the second connection socket 51. At this time, the sealing plug is inserted into the second connection socket 51 while screwing its own male screw portion into the female screw portion 51a of the second connection socket 51. The sealing plug thus inserted into the second connection socket 51 is prevented from coming off from the inside of second connection socket 51 by the above-described screw.

Among the three filtration systems (31) in the filtration treatment apparatus (20), the connecting pipe 70 is not inserted into the first connection socket 50 in the water collection cassette 41 of the uppermost filtration system (31). Instead, the above-described water collection branch pipe is inserted into the first connection socket 50. A male screw portion is provided on an outer peripheral surface of the water collection branch pipe. The water collection branch pipe is inserted into the first connection socket 50 while screwing its own male screw portion into the female screw portion of the first connection socket 50. The water collection branch pipe inserted into the first connection socket 50 in this manner is prevented from coming off from the inside of the first connection socket 50 by the above-described screw.

The present invention is not limited to the above-described embodiments and examples, and configurations different from the embodiments and examples can be employed within a range where the configurations of the present invention can be applied. The present invention has unique effects for each aspect described below.

[First Aspect]

A first aspect is a filtration membrane unit (for example, the filtration membrane unit 21) including a filtration membrane (for example, the filtration membrane 22) and a socket (for example, the suction side socket 23) fixed to an end on one side in a longitudinal direction of the filtration membrane in order to hold the filtration membrane on one side in the longitudinal direction, in which the socket extends in a lateral direction of the filtration membrane in a state of being fixed to the end, and the socket includes a recess (for example, the recess 23d) into which the end is inserted, a flow path (for example, the flow path 23e) communicating with the recess and extending in an extending direction of the socket, and a discharge port for discharging a filtrate in the flow path, in which the socket includes, as the discharge port, a first outlet (for example, the first outlet 23b-2) disposed on one side in the extending direction with respect to a center in the extending direction of the socket, and a second outlet (for example, the second outlet 23c-2) disposed on another side in the extending direction with respect to the center in the extending direction of the socket.

With such a configuration, similarly to the filtration membrane unit (21) according to the embodiment, maintainability of the filtration membrane can be improved.

[Second Aspect]

A second aspect is the filtration membrane unit having the configuration of the first aspect, in which the socket includes a socket body (for example, the socket body 23a) including the recess and the flow path, a first protrusion (for example, the first protrusion 23b), and a second protrusion (for example, second protrusion 23c), and the first protrusion and the second protrusion are arranged in a mode of being aligned side by side along the extending direction of the socket body while being positioned outside the socket body in the longitudinal direction of the filtration membrane.

With such a configuration, similarly to the filtration membrane unit (21) according to the embodiment, the end on one side in the longitudinal direction of the filtration membrane unit can be held by the holder by the first protrusion and the second protrusion.

[Third Aspect]

A third aspect is the filtration membrane unit having the configuration of the second aspect, in which the first outlet is provided in the first protrusion and communicates with the flow path via a hollow (for example, the hollow 23b-1) of the first protrusion, and the second outlet is provided in the second protrusion and communicates with the flow path via a hollow (for example, hollow 23c-1) of the second protrusion.

With such a configuration, as in the filtration membrane unit (21) according to the embodiment, the treated water in the filtration membrane unit can be discharged from the filtration membrane unit using the first protrusion and the second protrusion for holding the one end in the longitudinal direction of the filtration membrane unit with respect to the holder.

[Fourth Aspect]

A fourth aspect is the filtration membrane unit having the configuration of the third aspect, in which the first outlet is disposed on a distal end surface of the first protrusion, and the second outlet is disposed on a distal end surface of the second protrusion.

With such a configuration (distal end surface arrangement), unlike the circumferential surface arrangement, the flow of the treated water is not largely redirected in the hollow space of each of the first protrusion and the second protrusion, so that the flow path resistance can be reduced as compared with the circumferential surface arrangement.

[Fifth Aspect]

A fifth aspect is the filtration membrane unit having the configuration of the third aspect or the fourth aspect, in which a distance from a center in an extending direction of the socket body to the first protrusion and a distance from the center to the second protrusion are different from each other.

With such a configuration, similarly to the filtration membrane unit (21) according to the embodiment, while the inter-hole length of the inter-hole portion of the side plate is narrowed to the narrow limit value, the arrangement pitch of the plurality of filtration membrane units can be reduced as compared with the case where the former distance and the latter distance are the same as each other, and the filtration system can be downsized.

[Sixth Aspect]

A sixth aspect is a holder (for example, holder 40) that holds each of a plurality of filtration membrane units, the holder including a side plate (for example, first long side plate 43) that holds one end in a longitudinal direction of each of the plurality of filtration membrane units, in which each of the plurality of filtration membrane units is the filtration membrane unit of the fifth aspect, the side plate includes a plurality of hole pairs including an insertion hole into which one of the first protrusion and the second protrusion is inserted and an insertion hole into which one of the first protrusion and the second protrusion that is not inserted into the insertion hole is inserted, and in each of the plurality of hole pairs, two insertion holes are arranged along a lateral direction of the side plate, and in each of the plurality of hole pairs, distances in the lateral direction between two insertion holes are same, and a first type hole pair (for example, the first type hole pair 43c) classified into a first type among the plurality of hole pairs and a second type hole pair (for example, the second type hole pair 43f) classified into a second type among the plurality of hole pairs are alternately arranged along the longitudinal direction of the side plate, and an insertion hole located on one side in the lateral direction out of the two insertion holes (for example, the insertion hole 43d and the insertion hole 43e) of the first type hole pair is arranged at a predetermined first position along the lateral direction in a plane of the side plate, and an insertion hole located on one side in the lateral direction out of the two insertion holes of the second type hole pair is arranged at a predetermined second position along the lateral direction in a plane of the side plate, and the first position and the second position are different from each other.

With such a configuration, the arrangement pitch of the plurality of filtration membrane units (21) having the configuration of the fifth aspect can be reduced, and the filtration system can be downsized.

[Seventh Aspect]

A seventh aspect is a filtration system (for example, filtration system 31) including a plurality of filtration membrane units and a holder holding the filtration membrane units, in which each of the plurality of filtration membrane units is a filtration membrane unit having the configuration of any one of the first to fifth aspects.

With such a configuration, maintainability of the plurality of filtration membrane units mounted on the filtration system can be improved.

[Eighth Aspect]

An eighth aspect is the filtration system having the configuration of the seventh aspect, in which each of the plurality of filtration membrane units is a filtration membrane unit having the configuration of the fifth aspect, and the holder is the holder of the sixth aspect.

With such a configuration, the arrangement pitch of the plurality of filtration membrane units can be narrowed, and the filtration system can be downsized.

[Ninth Aspect]

A ninth aspect is a filtration treatment apparatus (for example, the filtration treatment apparatus 20) formed by combining a plurality of filtration systems, in which each of the plurality of filtration systems is a filtration system having the configuration of the seventh aspect or the eighth aspect.

With such a configuration, it is possible to miniaturize the filtration treatment apparatus by miniaturizing the plurality of filtration systems by narrowing the arrangement pitch of the plurality of filtration membrane units.

REFERENCE SIGNS LIST

20 Filtration treatment apparatus
21 Filtration membrane unit
22 Filtration membrane
23 Suction side socket (socket)
23a Socket body
23b First protrusion
23b-1 Hollow
23b-2 First outlet
23c Second protrusion
23c-1 Hollow
23c-2 Second outlet 23d Recess
23e Flow path
31 Filtration system

The invention claimed is:

1. A filtration system comprising a plurality of filtration membrane units and a holder holding the filtration membrane units in parallel, wherein
the filtration membrane unit includes:
a filtration membrane;
a suction side socket that is fixed to an end in a longitudinal direction of the filtration membrane and extends in a lateral direction of the filtration membrane to form a flow path through which a filtrate flows, and
in the suction side socket, a plurality of protrusions each having a discharge port for the filtrate is arranged at intervals on one side and another side in the lateral direction, and
the holder includes a plurality of first holes into which the protrusions on the one side are respectively inserted and a plurality of second holes into which the protrusions on the another side are respectively inserted, and
positions of the first holes into which the protrusions on the one side are inserted and positions of the second holes into which the protrusions on the another side are inserted are deviated in the lateral direction between a first filtration membrane unit and a second filtration membrane unit arranged adjacent to the first filtration membrane unit.

2. The filtration system according to claim 1, wherein the filtration membrane has a rectangular shape.

3. The filtration system according to claim 1, wherein the filtration membrane unit includes a first protrusion disposed at a first distance from a center of the suction side socket in the lateral direction and a second protrusion disposed at a second distance different from the first distance from the center of the suction side socket in the lateral direction, and
in the first filtration membrane unit, the protrusions on the one side to be inserted into the first holes are the first protrusion, and the protrusions on the another side to be inserted into the second holes are the second protrusion, and
in the second filtration membrane unit, the protrusions on the one side to be inserted into the first holes are the second protrusion, and the protrusions on the another side to be inserted into the second holes are the first protrusion.

4. The filtration system according to claim 3, wherein
in each of the filtration membrane units, the suction side socket is attached to one side in the longitudinal direction, and the another side in the longitudinal direction is supported via a shielding side socket attached to the another side in the longitudinal direction,
the first protrusion provided on the suction side socket is disposed at a position deviated to one side of the second protrusion in the lateral direction of the filtration membrane and is disposed at a position deviated to a side of the center of the suction side socket with respect to an end on one side of the suction side socket, and
a first deviation amount indicating magnitude of deviation of the first protrusion with respect to the second protrusion and a second deviation amount indicating magnitude of deviation of the first protrusion with respect to the end on one side of the suction side socket are each set in a range of $1/4$ to $1/3$ of a length in an extending direction of the suction side socket.

5. The filtration system according to claim 1, wherein
the second filtration membrane unit is configured by vertically inverting the first filtration membrane unit, and
the holder alternately holds the first filtration membrane unit and the second filtration membrane unit in a direction intersecting the longitudinal direction and the lateral direction.

6. A filtration treatment apparatus formed by combining a plurality of filtration systems, wherein
each of the plurality of filtration systems is the filtration system according to claim 1.

* * * * *